(12) United States Patent
Denis et al.

(10) Patent No.: US 11,350,561 B2
(45) Date of Patent: Jun. 7, 2022

(54) BALANCED FAN PLENUM FOR DISTRIBUTING PARTICULATE MATERIAL

(71) Applicant: CNH Industrial Canada, Ltd, Saskatoon (CA)

(72) Inventors: Joel Denis, Saskatoon (CA); Samuel Ferre, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 156 days.

(21) Appl. No.: 16/691,913

(22) Filed: Nov. 22, 2019

(65) Prior Publication Data

US 2021/0153425 A1  May 27, 2021

(51) Int. Cl.
*A01C 7/08* (2006.01)
*A01C 15/04* (2006.01)
(Continued)

(52) U.S. Cl.
CPC ............... *A01C 15/04* (2013.01); *A01C 7/084* (2013.01); *A01C 7/082* (2013.01); *A01M 9/003* (2013.01); *B65G 53/42* (2013.01); *B65G 53/50* (2013.01)

(58) Field of Classification Search
CPC .. B65G 53/528; B65G 53/50; B65G 2201/04; B65G 2201/042; B65G 2812/1608;
(Continued)

(56) References Cited

U.S. PATENT DOCUMENTS 1,871,853 A * 8/1932 Josephe ................. F23K 3/00
406/181
1,905,733 A * 4/1933 Moore ................... F15D 1/14
137/101
(Continued)

FOREIGN PATENT DOCUMENTS

CN        203151996        8/2013

OTHER PUBLICATIONS

"Understanding 1910 Commodity Cart Air Velocity and Hose Routings"; manual; Jul. 22, 2019; John Deer Company; 2 pages; available at: http://manuals.deere.com/omview/OMA77489_19/OUO6023_000018F__19__08DEC00_1.htm; website accessed Jul. 22, 2019.

(Continued)

*Primary Examiner* — Joseph A Dillon, Jr.
(74) *Attorney, Agent, or Firm* — Rebecca L. Henkel; Rickard K. DeMille (57) ABSTRACT

The present invention provides a plenum configured to evenly separate and distribute airflow generated by a fan into distribution lines of an agricultural machine. The plenum can utilize angled vanes symmetrically or asymmetrically arranged to form plenum chambers to provide a balanced airflow which contributes to maximizing fan efficiency, including power consumption and performance (airflow and static maintained for increased manufacturability and to prevent additional expansion. The plenum length can be configured within allowable space constraints of the machine yet allow airflow to develop upon separation into the lines. Vanes throughout the span of the plenum initially divide the airflow from the fan and maintain separation until the outlets.

20 Claims, 5 Drawing Sheets

(51) Int. Cl.
*B65G 53/50* (2006.01)
*A01M 9/00* (2006.01)
*B65G 53/42* (2006.01)

(58) Field of Classification Search
CPC ..... B65G 2812/1616; B65G 2812/1625; F16L 41/023; Y10T 137/85938; A01C 7/0842; A01C 15/04
USPC ............ 406/181; 137/561 A; 111/174
See application file for complete search history.

(56) References Cited

U.S. PATENT DOCUMENTS

| | | | |
|---|---|---|---|
| 4,255,082 A * | 3/1981 | Goebel | F16L 41/023 |
| | | | 415/182.1 |
| 4,717,289 A | 1/1988 | Popowich et al. | |
| 5,775,585 A * | 7/1998 | Duello | A01C 15/04 |
| | | | 239/654 |
| 5,979,343 A * | 11/1999 | Gregor | A01C 7/081 |
| | | | 111/175 |
| 6,478,340 B1 * | 11/2002 | Butler | F01N 13/08 |
| | | | 138/39 |
| 6,811,358 B2 * | 11/2004 | Bauver | B65G 53/528 |
| | | | 406/113 |
| 7,536,962 B2 * | 5/2009 | Eastin | A01C 1/04 |
| | | | 111/118 |
| 8,403,602 B2 | 3/2013 | Zarnescu | |
| 8,469,636 B2 | 6/2013 | Jost et al. | |
| 8,733,257 B2 | 5/2014 | Beaujot et al. | |
| 8,770,649 B2 * | 7/2014 | Praskovsky | B62D 35/001 |
| | | | 296/180.1 |
| 9,681,600 B2 | 6/2017 | Henry et al. | |
| 9,797,599 B2 * | 10/2017 | Zarnescu | B65G 53/528 |
| 9,902,571 B2 | 2/2018 | Hui et al. | |
| 10,143,129 B2 | 12/2018 | Roberge et al. | |
| 10,306,825 B2 | 6/2019 | Hui et al. | |
| 11,066,254 B1 * | 7/2021 | Pederson | B65G 53/04 |
| 2012/0237304 A1 * | 9/2012 | Zarnescu | F23K 3/02 |
| | | | 406/181 |
| 2019/0022608 A1 | 1/2019 | Roberge et al. | |
| 2020/0221631 A1 * | 7/2020 | Setterdahl | A01C 7/20 |

OTHER PUBLICATIONS

"High Pressure Air Movement for Agriculture" by Smallaire Air Movement Specialists; website accessed on Sep. 26, 2019; 4 pages; available at: https://smallaire.com.au/agriculture/high-pressure-blowers.

* cited by examiner

BALANCED FAN PLENUM FOR DISTRIBUTING PARTICULATE MATERIAL

FIELD OF THE INVENTION

The present invention pertains to agricultural equipment and, more specifically, to a system for distributing particulate material from an applicator in which a plenum coupled to a fan divides an airflow into multiple airflow components, each airflow component being directed through a plenum chamber, with each plenum chamber being separated from an adjacent plenum chamber by a plenum vane configured at an angle relative to the adjacent plenum chamber with the plenum chambers being configured in a symmetrical arrangement.

BACKGROUND OF THE INVENTION

Agricultural product delivery systems are known to utilize various mechanisms, including mechanical and pneumatic systems to move granular or particulate material or product, such as fertilizer, seed, insecticide or herbicide, from a product supply chamber, through a series of elongated tubes that extend from a product supply chamber to a product applicator, and placing the product on, or in a growing medium, such as soil. Such agricultural product delivery systems are commonly employed in planters, air drills, fertilizer and pesticide applicators and a variety of other agricultural implements.

In systems as described, sectional control is oftentimes implemented in which distribution lines leading to various sections of the machine with nozzles can have differing product distribution rates. However, such sectional control can result in static pressures imbalances across the lines of the distribution system which can be problematic, contributing to an inefficiency which requires operating the fan at a higher power consumption level to ensure that all lines receive a minimum airflow. A need therefore exists to provide a system for distribution of particulate material that eliminates one or more of the foregoing disadvantages.

SUMMARY OF THE INVENTION

The present invention provides a plenum configured to evenly separate and distribute airflow generated by a fan into distribution lines of an agricultural machine. The plenum can utilize angled vanes symmetrically or asymmetrically arranged to form plenum chambers to provide a balanced airflow which contributes to maximizing fan efficiency, including power consumption and performance (airflow and static pressure). Accordingly, the plenum can be configured to separate the airflow and minimize imbalance between the lines during sectional control. The plenum height can be maintained for increased manufacturability and to prevent additional expansion. The plenum length can be configured within allowable space constraints of the machine yet allow airflow to develop upon separation into the lines. Vanes throughout the span of the plenum initially divide the airflow from the fan and maintain separation until the outlets. Moreover, in one aspect, the plenum vanes can be configured to also compensate for an imbalanced fan, such as when an inlet on one side causes the fan to favor one direction over another. The vanes can help to compensate for such an effect and balance the distribution.

In one aspect, a fan plenum can be configured with a gradual expansion from a fan outlet to a plenum faceplate. The height and width of the faceplate can be minimized to accommodate the equivalent area of two 5" and two 2.5" pipe diameters, such as a 5" pipe from a left plenum chamber, two 2.5" pipes from a center plenum chamber, and a 5" pipe from a left plenum chamber, or six 2.5" pipe diameters, such as two 2.5" pipes from a left plenum chamber, two 2.5" pipes from a center plenum chamber and two 2.5" pipes from a right plenum chamber. Each 5" pipe can be used for a supply line to a section. The two 2.5" pipes can be used together for a supply line to a section, such as the rear section of the machine, instead of an additional 5" pipe, to minimize the faceplate area and because of the reduced airflow requirements for such supply line. Two redirecting vanes can be placed within the plenum from the inlet to the faceplate. The vane height can be equivalent to the plenum height and can create three separate volumes within the plenum: one for the two 2.5" pipes, and two for the 5" pipes. In addition, the outlets tubes or pipes can be arranged at an angle.

Accordingly, a plenum of the present invention can achieve balancing by redirecting vanes. This can minimize pressure drop throughout the plenum and allow the fan to operate more efficiently.

Specifically then, one aspect of the present invention can provide a system for distributing particulate material from an applicator. The system can include: a fan configured to produce an airflow; a plenum coupled to the fan, the plenum including multiple plenum chambers, the plenum being configured to divide the airflow into multiple airflow components, each airflow component being directed through a plenum chamber, each plenum chamber being separated from an adjacent plenum chamber by a plenum vane configured at an angle relative to the adjacent plenum chamber with the multiple plenum chambers being configured in a symmetrical arrangement, each plenum chamber having a plenum outlet; and multiple supply lines coupled to the plenum, each supply line being configured to receive an airflow component from a plenum outlet.

Another aspect of the present invention can provide a method for distributing particulate material from an applicator. The method can include: producing an airflow from at least one fan; providing a plenum coupled to the fan for dividing the airflow into multiple airflow components, each airflow component being directed through a plenum chamber of the plenum, each plenum chamber being separated from an adjacent plenum chamber by a plenum vane configured at an angle relative to the adjacent plenum chamber, each plenum chamber having a plenum outlet; and providing multiple supply lines coupled to the plenum, each supply line receiving an airflow component from a plenum outlet.

Another aspect of the present invention can provide an agricultural application implement including: a frame including multiple wheels supporting: a fan configured to produce an airflow; a plenum coupled to the fan, the plenum including multiple plenum chambers, the plenum being configured to divide the airflow into multiple airflow components, each airflow component being directed through a plenum chamber, each plenum chamber being separated from an adjacent plenum chamber by a plenum vane configured at an angle relative to the adjacent plenum chamber, each plenum chamber having a plenum outlet; multiple supply lines coupled to the plenum, each supply line being configured to receive an airflow component from a plenum outlet and entrain particulate material in the airflow component; multiple boom sections, each boom section being connected to a supply line for receiving the airflow component and entrained particulate material, each boom section including multiple nozzles for distributing particulate material.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
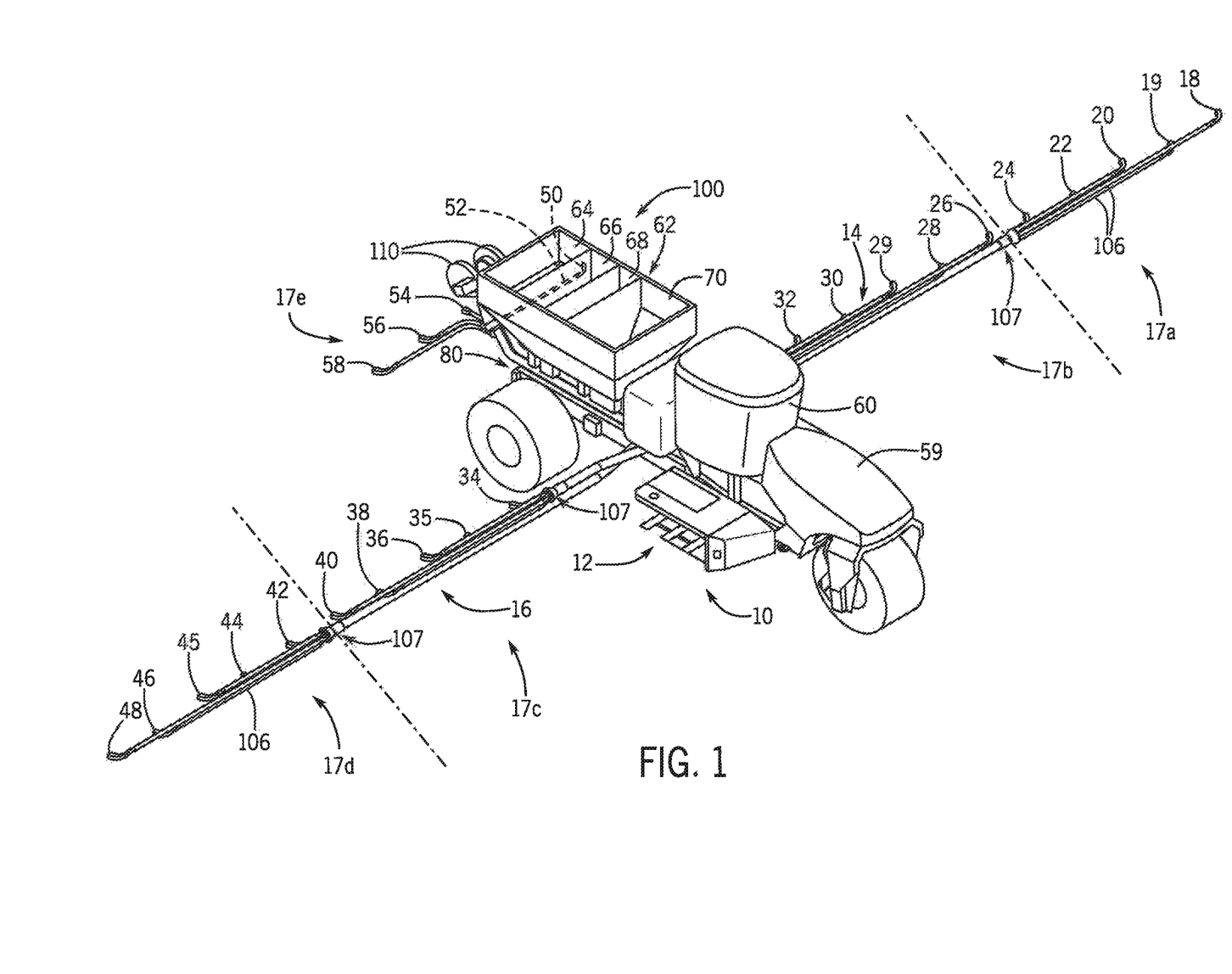
FIG. 1 illustrates an isometric view of an exemplary aspect of an agricultural application implement in the form of a dry granular applicator, comprising a system for distributing particulate material in accordance with an aspect of the present invention.
Figure 2:
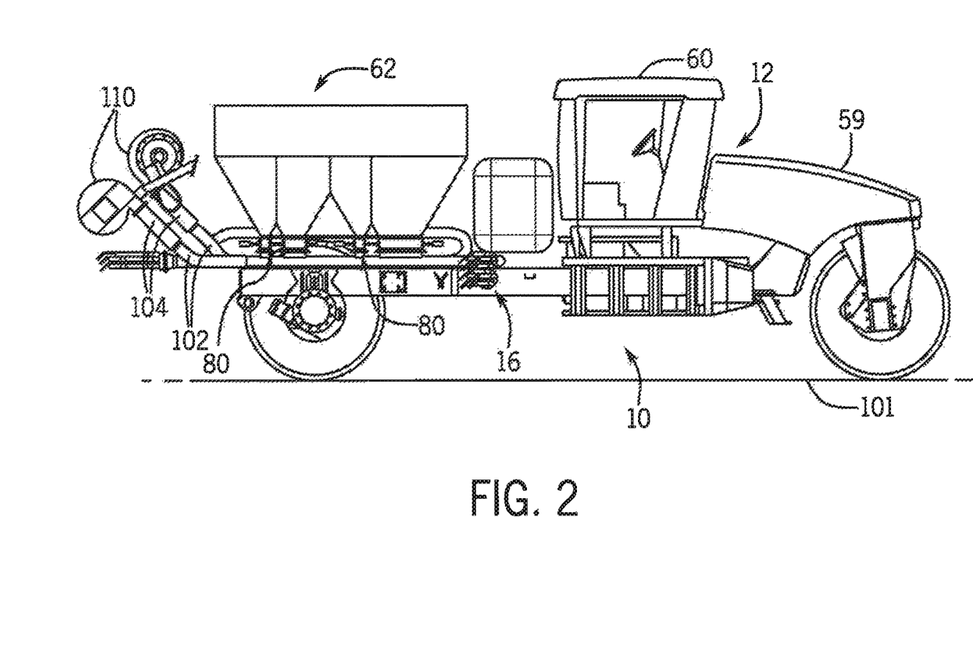
FIG. 2 illustrates a side elevation view of the applicator of FIG. 1, in accordance with an aspect of the present invention.
Figure 3:
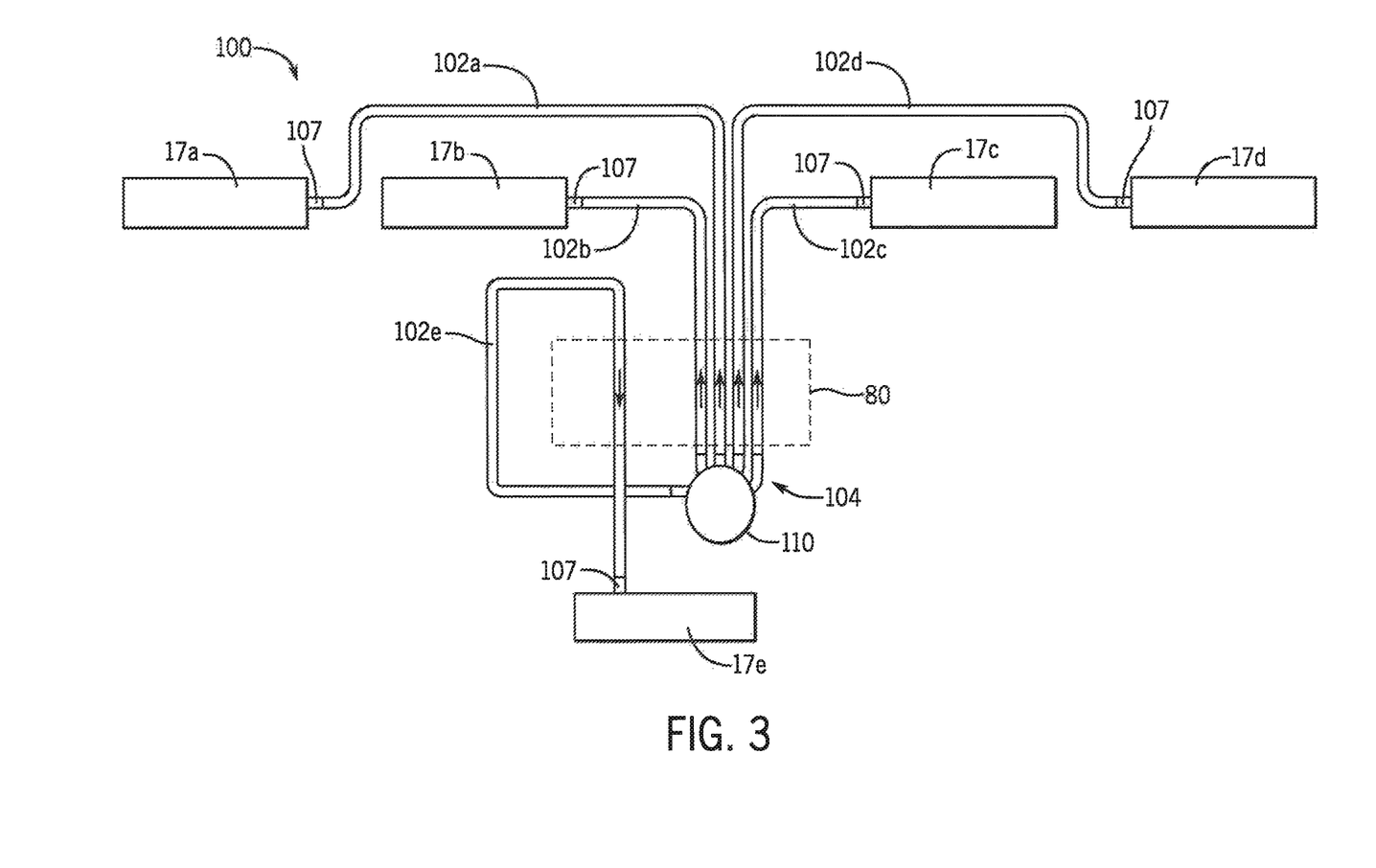
FIG. 3 illustrates a pneumatic conveying system of the applicator of FIG. 1 for distributing particulate material, supply lines and boom sections in accordance with an aspect of the present invention.

Referring now to the drawings, and more particularly to FIGS. 1 and 2, there is shown an agricultural application implement 10, which could be a dry pneumatic granular applicator. As is known in the art, implement 10 generally includes a large wheeled transport unit 12 such as truck or tractor, and laterally extending particle delivery booms 14 and 16, which may be pivoted to a stowed position close to the implement for storage or transport. Each boom 14, 16 extends laterally from the implement 10 in opposite directions. Each boom 14, 16 includes a plurality of boom sections 17, such as left outer and left inner boom sections 17*a*, 17*b* of boom 14, and right inner and right outer boom sections 17*c*, 17*d* of boom 16. Each boom section 17 is defined by a large diameter supply line 102 for supplying the boom section with granular or particulate material, such as seed, fertilizer, herbicide, insecticide and the like. Each boom section 17 includes a plurality of boom tubes or conduits terminating at particle delivering units, which for the implement 10 are spreading outlets or nozzles. In the exemplary embodiment shown, left outer boom section 17*a* of boom 14 includes five nozzles 18, 19, 20, 22 and 24; left inner boom section 17*b* of boom 14 includes five nozzles 26, 28, 29, 30 and 32; right inner boom section 17*c* of boom 16 includes five nozzles 34, 35, 36, 38 and 40; and right outer boom section 17*d* of boom 16 includes five nozzles 42, 44, 45, 46 and 48. Additionally, at the back of implement 10 there is a centrally mounted rear boom section 17*e* also defined by a large diameter supply line 102 for supplying the boom section with granular material. At the rear boom section 17*e* are five rear nozzles 50, 52, 54, 56 and 58 to provide full and complete coverage across the width of implement 10, including the area between the inboard-most nozzles 32 and 34 of booms 14, 16. The rear boom section 17*e* allows spread of the particulate material/product over/onto the ground 101 over which the implement 10 passes for complete coverage. Although five boom sections 17, with five nozzles per boom section, is shown by way of example, in other aspects greater or fewer boom sections 17, and/or greater or fewer nozzles per boom section 17, can be provided within the scope of the invention.

The transport unit 12 can be self-propelled by an engine in an engine compartment 59 and can include an operator cab 60 having a Human Machine Interface (HMI) available to the user. In the exemplary aspect shown, an uncovered tank 62 includes compartments 66 and 70 for carrying particulate material to be distributed in a metering section 80 for ultimate disbursement by nozzles 18-58. Further smaller compartments 64 and 68 are provided to supply micronutrients or other materials in the metering section 80. The supply of particulate in compartments 64, 66, 68, 70 can be replenished periodically from a supply vehicle (not shown).

As shown in FIGS. 1-3 by way of example, the compartments 64-70 of the tank 62 and the metering section 80 are disposed directly above a conveying system 100, which could be a pneumatic conveying system or assembly. The conveying system 100 includes multiple large diameter supply lines 102, which could be 5 inches in diameter, that extend from a plenum 104 at one end, under the compartments 64-70 and terminate at individual boom sections 17. At each boom section 17, the supply lines 102 and the particulate material or product transported therein are split by a suitable distribution structure or mechanism 107, such as a plurality of horizontal rotary or stationary distributors, among or into a number of secondary or smaller supply lines 106, which could be 2.5 inches in diameter, that are connected to individual nozzles 18-58.

To collect and drive the particulate material along the lines 102, one or more fans 110 can be operably connected to the plenum 104 opposite the inlet ends of lines 102 as described herein. The air flow from the fans 110 is directed through the plenum 104 and into the respective lines 102 as a result of the structure of the plenum 104. After the air flow passes through the plenum 104 and collects/entrains the particulate material from the compartments 64-70 via the metering section 80, the air flow continues to flow along each large diameter supply line 102, including with one or more 90° and/or 180° turns, to connect to the various boom sections 17. The fans 110 could be centrifugal fans that are 8 inches or less in diameter, and in some aspects, 6 inches or less.

Referring now to FIGS. 4-7, various views of an exemplar fan 110 configured to produce an airflow, and a plenum 104 coupled to the fan 110, is provided in accordance with an aspect of the present invention. The plenum 104 can include multiple plenum chambers 120, such as first, second and third plenum chambers 120a, 120b and 120c, respectively. Each plenum chamber 120 can have a plenum outlet, such as first, second and third plenum outlets 121a, 121b and 121c, respectively. As illustrated in the plan view of FIG. 6, the plenum 104 can be configured to divide an airflow 122 into a plurality of airflow components 124, such as first, second and third airflow components 124a, 124b and 124c, respectively, with each airflow component 124 being directed through a given plenum chamber 120. To divide the airflow 122, each plenum chamber 120 can be separated from an adjacent plenum chamber 120 by a plenum vane 126. For example, the first plenum chamber 120a (outside) can be separated from the third plenum chamber 120c (middle) by a plenum vane 126a. Similarly, the second plenum chamber 120b (outside) can be separated from the third plenum chamber 120c (middle) by a plenum vane 126b.

Figure 6:
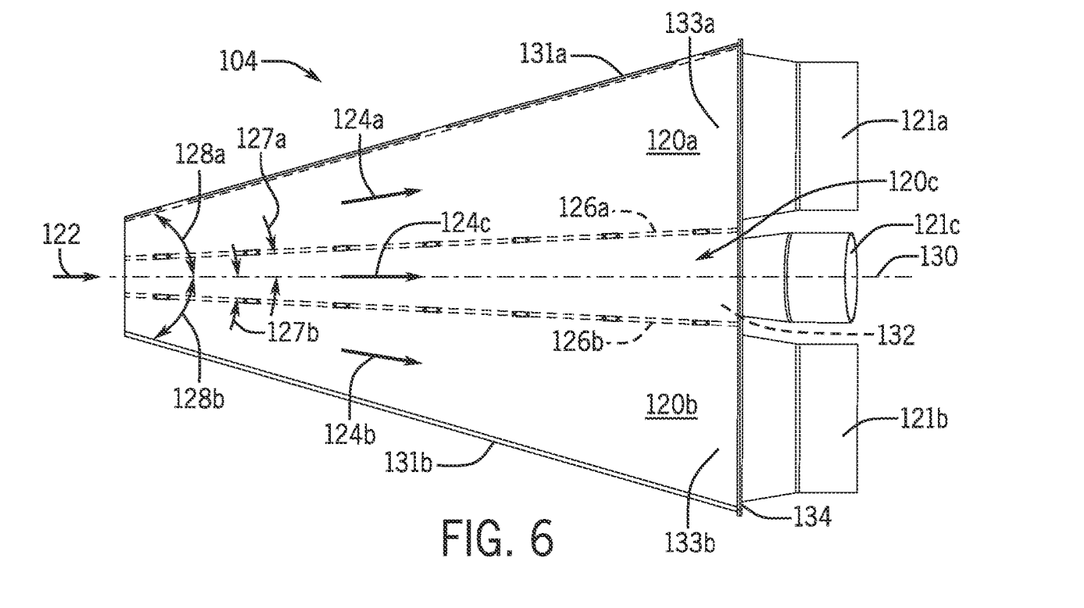
FIG. 6 illustrate a plan view of the plenum of FIG. 3.

To achieve an optimal airflow, the plenum vanes 126 can each be configured at an angle relative to adjacent plenum chambers 120, from inlet to outlet, with the plenum chambers 120 being configured in a symmetrical arrangement. The symmetrical arrangement can be defined with respect to a central, longitudinal axis 130 of the plenum 104, disposed in a direction of the airflow 122. In one aspect, an angle 127a of the plenum vane 126a could be at least 2 degrees, and perhaps 2.7 degrees, relative to the longitudinal axis 130, angling toward the first plenum chamber 120a. Similarly, in symmetrical fashion, an angle 127b of the plenum vane 126b could be at least 2 degrees, and perhaps 2.7 degrees, relative to the longitudinal axis 130, angling toward the second plenum chamber 120b. Such angling of the first and second plenum vanes 126a and 126b, respectively, can result in a flared end 132 of the third plenum chamber 120c (middle), nearer its plenum outlet 121c, such that the plenum outlets angle away from one another.

In addition, outermost plenum chambers on opposing sides of the plenum can have outer plenum walls configured at an angle relative to the longitudinal axis 130, from inlet to outlet, in the symmetrical arrangement. For example, the first plenum chamber 120a, being an outermost plenum chamber on one side of the plenum 104, can have an outer plenum wall 131a configured at an angle relative to the longitudinal axis 130. In one aspect, an angle (e.g., second angle) 128a of the outer plenum wall 131a could be at least 15 degrees, and perhaps 15.8 degrees, relative to the longitudinal axis 130, angling outward, away from the longitudinal axis 130. Similarly, in symmetrical fashion, an angle (e.g., second angle) 128b of an outer plenum wall 131b could be at least 15 degrees, and perhaps 15.8 degrees, relative to the longitudinal axis 130, angling outward, away from the longitudinal axis 130, in the opposite direction. Such angling of the outer plenum walls 131 can result in widened ends 133a and 133b of the first and second plenum chambers 120a and 120b, respectively, nearer their plenum outlets.

Figure 4:
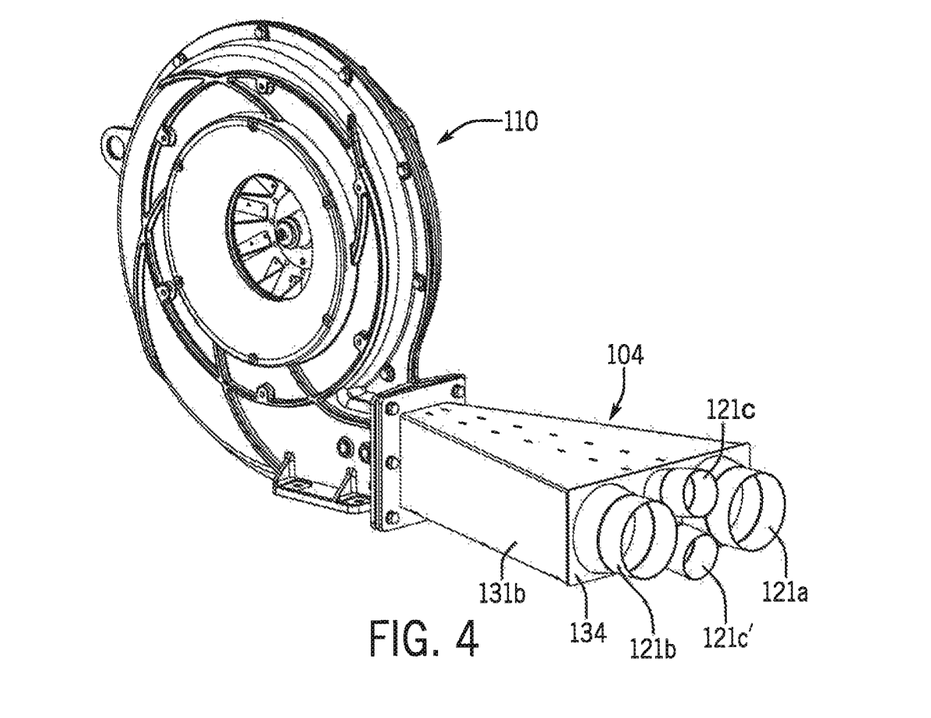
FIG. 4 illustrates an isometric view of an exemplar fan and plenum of the pneumatic conveying system of FIG. 3 in accordance with an aspect of the present invention.
Figure 5:
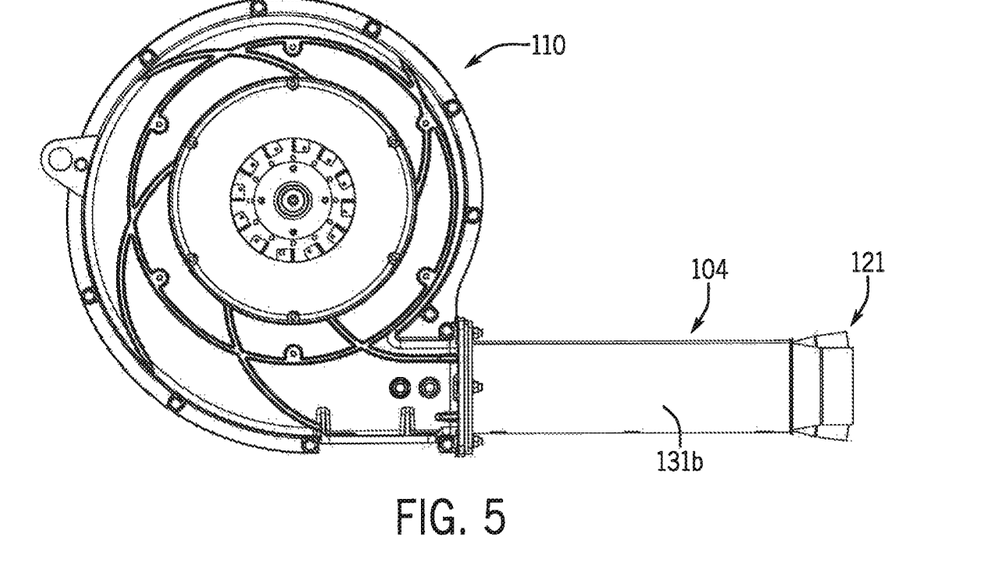
FIG. 5 illustrate a side view of the fan and plenum of FIG. 3.
Figure 7:
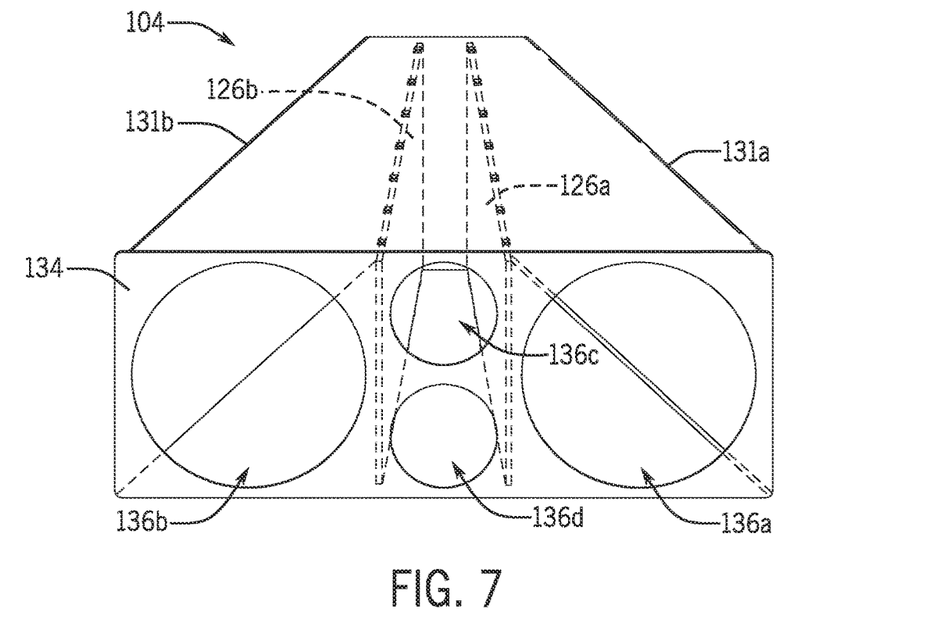
FIG. 7 illustrate an isometric outlet view of the plenum of FIG. 3.

As may best be seen in FIG. 7, a plenum outlet faceplate 134 can be arranged at an outlet end of the plenum 104. The plenum outlet faceplate 134 can include multiple openings 136, such as first, second, third and fourth openings 136a, 136b, 136c and 136d, respectively. One or more of the openings can correspond to a plenum outlet 121. For example, in one aspect, the plenum outlet faceplate 134 can include four openings 136. With particular reference to FIGS. 4 and 7, the first plenum chamber 120a can have its plenum outlet 121a corresponding to a first opening 136a; the second plenum chamber 120b can have its plenum outlet 121b corresponding to a second opening 136b; and the third plenum chamber 120c can have two plenum outlets 121c and 121c' corresponding to third and fourth openings 136c and 136d, respectively.

With one plenum outlet of the first plenum chamber 120a, and one plenum outlet of the second plenum chamber 120b, the one plenum outlet of each plenum chamber can have an outlet diameter that is at least twice the outlet diameter of the multiple plenum outlets of the third plenum chamber 120c. For example, with first and second plenum outlets 121a and 121b, respectively, each having an outlet diameter of 5 inches (or more), the third plenum outlet 121c could have an outlet diameter of 2.5 inches (or correspondingly more). Allowing such smaller outlets, but using twice as many, advantageously permits optimized plenum chambers with a narrower cross-section transverse to the longitudinal axis 130.

Accordingly, the plenum 104 can be configured to evenly separate and distribute the airflow 122 generated by the one or more fans 110 into supply lines 102. The angled plenum vanes 126 being symmetrically arranged to form the plenum chambers 120 can provide a balanced airflow which contributes to maximizing fan efficiency. Accordingly, the plenum 104 can be configured to separate the airflow 122 and minimize imbalance between the lines 102 during individual control with respect to sections 17. The plenum height can be maintained for increased manufacturability and to prevent additional expansion. The plenum length can be configured within allowable space constraints of the implement 10 yet allow the airflow to develop upon separation into the lines 102. The plenum vanes 126 throughout the span of the plenum 104 initially divide the airflow 122 from the fan and maintain separation in airflow components 124 until the plenum outlets 121. Alternatively, the angled plenum vanes 126 could be asymmetrically arranged, so as to accommodate an unbalanced fan.

In one aspect, as illustrated in FIGS. 4-7, the plenum 104 can be configured with a gradual expansion from an outlet of the fan 110 to the plenum outlet faceplate 134. The height and width of the faceplate 134 can be minimized to accommodate the equivalent area of two 5" pipe diameters, from the first and second plenum chambers 120a and 120b, respectively, and two 2.5" pipe diameters, from the third plenum chambers 120c. Each 5" pipe can be used for a supply line 102 to a section 17, The two 2.5" pipes can be used together for a supply line 102 to a section 17, such as the rear section 17e, instead of an additional 5" pipe, to minimize the faceplate area and because of the reduced airflow requirements for such supply lines to the rear section. The first and second plenum vanes 126a and 126b, respectively, act as redirecting vanes within the plenum 104 from the inlet to the faceplate 134. A height of each plenum vane 126 can be equivalent to the overall plenum height, and the plenum vanes 126 can create three separate volumes within the plenum 104: one for the two 2.5" pipes, and two for the 5" pipes.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A particulate material distribution system, comprising:
a fan configured to produce an airflow;
a plenum coupled to the fan, the plenum comprising a plurality of plenum chambers, the plenum being configured to divide the airflow into a plurality of airflow components, each airflow component being directed through a respective plenum chamber of the plurality of plenum chambers, each plenum chamber of the plurality of plenum chambers being separated from an adjacent plenum chamber of the plurality of plenum chambers by a respective plenum vane oriented at an angle relative to a longitudinal axis of the plenum, each plenum chamber of the plurality of plenum chambers having at least one respective plenum outlet, wherein a first plenum chamber of the plurality of plenum chambers consists of one plenum outlet, and a second plenum chamber of the plurality of plenum chambers comprises at least two plenum outlets; and
a plurality of supply lines coupled to the plenum, each supply line of the plurality of supply lines being configured to receive a respective airflow component from a respective plenum outlet.

2. The particulate material distribution system of claim 1, further comprising a plenum outlet faceplate at an outlet end of the plenum, the plenum outlet faceplate comprising a plurality of openings, each opening of the plurality of openings corresponding to a respective plenum outlet.

3. The particulate material distribution system of claim 2, wherein the plurality of openings of the plenum outlet faceplate comprises at least four openings corresponding to four respective plenum outlets.

4. The particulate material distribution system of claim 1, wherein the one plenum outlet of the first plenum chamber has an outlet diameter that is at least twice an outlet diameter of any plenum outlet of the second plenum chamber.

5. The particulate material distribution system of claim 4, wherein the outlet diameter of the one plenum outlet of the first plenum chamber is at least 5 inches, and the outlet diameters of the plenum outlets of the second plenum chamber are at least 2.5 inches.

6. The particulate material distribution system of claim 1, wherein the angle is at least 2 degrees relative to the longitudinal axis of the plenum.

7. The particulate material distribution system of claim 1, wherein the plurality of plenum chambers comprises outermost plenum chambers on opposing sides of the plenum, the outermost plenum chambers each having an outer plenum wall, the outer plenum wall being oriented at a second angle relative to the longitudinal axis of the plenum.

8. The particulate material distribution system of claim 7, wherein the second angle is at least 15 degrees.

9. The particulate material distribution system of claim 1, wherein a length of the plenum along the longitudinal axis is at least 19 inches.

10. The particulate material distribution system of claim 1, wherein the plurality of airflow components comprises first, second and third airflow components, and the plurality of plenum chambers of the plenum comprises first, second and third plenum chambers.

11. An agricultural application implement comprising:
a plurality of wheels supporting a frame supporting:
a fan configured to produce an airflow;
a plenum coupled to the fan, the plenum comprising a plurality of plenum chambers, the plenum being configured to divide the airflow into a plurality of airflow components, each airflow component being directed through a respective plenum chamber of the plurality of plenum chambers, each plenum chamber of the plurality of plenum chambers being separated from an adjacent plenum chamber of the plurality of plenum chambers by a respective plenum vane oriented at an angle relative to a longitudinal axis of the plenum, each plenum chamber of the plurality of plenum chambers having at least one respective plenum outlet, wherein a first plenum chamber of the plurality of plenum chambers consists of one plenum outlet, and a second plenum chamber of the plurality of plenum chambers comprises at least two plenum outlets;
a plurality of supply lines coupled to the plenum, each supply line of the plurality of supply lines being configured to receive a respective airflow component from a respective plenum outlet and entrain particulate material in the respective airflow component; and
a plurality of boom sections, each boom section of the plurality of boom sections being connected to a respective supply line of the plurality of supply lines to receive the respective airflow component and entrained particulate material, each boom section of the plurality of boom sections comprising a plurality of nozzles configured to distribute the particulate material.

12. The implement of claim 11, further comprising a plenum outlet faceplate at an outlet end of the plenum, the plenum outlet faceplate comprising a plurality of openings, each opening of the plurality of openings corresponding to a respective plenum outlet.

13. The implement of claim 12, wherein the plurality of openings of the plenum outlet faceplate comprises at least four openings corresponding to four respective plenum outlets.

14. The implement of claim 11, wherein the one plenum outlet of the first plenum chamber has an outlet diameter that is at least twice an outlet diameter of any plenum outlet of the second plenum chamber.

15. A particulate material distribution system, comprising:

a fan configured to produce an airflow;

a plenum coupled to the fan, the plenum comprising a plurality of plenum chambers, the plenum being configured to divide the airflow into a plurality of airflow components, each airflow component being directed through a respective plenum chamber of the plurality of plenum chambers, each plenum chamber of the plurality of plenum chambers being separated from an adjacent plenum chamber of the plurality of plenum chambers by a respective plenum vane oriented at an angle relative to a longitudinal axis of the plenum, each plenum chamber of the plurality of plenum chambers having at least one respective plenum outlet;

a plurality of supply lines coupled to the plenum, each supply line of the plurality of supply lines being configured to receive a respective airflow component from a respective plenum outlet; and a metering section configured to distribute particulate material to the plurality of supply lines, wherein the plenum is positioned upstream of the metering section along the plurality of supply lines, and each supply line of the plurality of supply lines is configured to entrain the particulate material within the respective airflow component.

16. The particulate material distribution system of claim 15, wherein a first plenum chamber of the plurality of plenum chambers consists of one plenum outlet, and a second plenum chamber of the plurality of plenum chambers comprises at least two plenum outlets.

17. The particulate material distribution system of claim 16, wherein the one plenum outlet of the first plenum chamber has an outlet diameter that is at least twice an outlet diameter of any plenum outlet of the second plenum chamber.

18. The particulate material distribution system of claim 17, wherein the outlet diameter of the one plenum outlet of the first plenum chamber is at least 5 inches, and the outlet diameters of the plenum outlets of the second plenum chamber are at least 2.5 inches.

19. The particulate material distribution system of claim 15, further comprising a plenum outlet faceplate at an outlet end of the plenum, the plenum outlet faceplate comprising a plurality of openings, each opening of the plurality of openings corresponding to a respective plenum outlet.

20. The particulate material distribution system of claim 19, wherein the plurality of openings of the plenum outlet faceplate comprises at least four openings corresponding to four respective plenum outlets.

* * * * *